United States Patent
Yang et al.

(10) Patent No.: US 8,625,569 B2
(45) Date of Patent: Jan. 7, 2014

(54) POWER CONTROL METHOD AND DEVICE

(75) Inventors: Bo Yang, Beijing (CN); Chuanfeng He, Beijing (CN); Xueli Ma, Shanghai (CN); Zongjie Wang, Shanghai (CN); Jing Li, Shanghai (CN); Jie Ma, Beijing (CN)

(73) Assignee: Huawei Technologies Co., Ltd. (CN)

( * ) Notice: Subject to any disclaimer, the term of this patent is extended or adjusted under 35 U.S.C. 154(b) by 32 days.

(21) Appl. No.: 13/282,736

(22) Filed: Oct. 27, 2011

(65) Prior Publication Data

US 2012/0039327 A1 Feb. 16, 2012

Related U.S. Application Data

(63) Continuation of application No. PCT/CN2009/071484, filed on Apr. 27, 2009.

(51) Int. Cl.
*H04B 7/216* (2006.01)

(52) U.S. Cl.
USPC .......................................................... 370/342

(58) Field of Classification Search
USPC .......................................................... 370/342
See application file for complete search history.

(56) References Cited

U.S. PATENT DOCUMENTS

| | | | |
|---|---|---|---|
| 6,701,135 B2 | 3/2004 | Posti | |
| 2003/0045333 A1* | 3/2003 | Kimata et al. | 455/574 |
| 2003/0054851 A1 | 3/2003 | Jo | |
| 2004/0009783 A1 | 1/2004 | Miyoshi | |
| 2005/0031047 A1 | 2/2005 | Maltsev et al. | |
| 2008/0151840 A1 | 6/2008 | Baker et al. | |
| 2012/0176947 A1* | 7/2012 | Xi et al. | 370/311 |
| 2013/0094483 A1* | 4/2013 | Marinier et al. | 370/336 |

FOREIGN PATENT DOCUMENTS

| | | |
|---|---|---|
| CN | 101170331 | 4/2008 |
| EA | 010986 B1 | 12/2008 |
| KR | 10-2006-0073593 | 6/2006 |
| RU | 2006108531 A | 7/2006 |
| WO | 2005/015768 | 2/2005 |
| WO | 2007/016117 | 2/2007 |

OTHER PUBLICATIONS $3^{rd}$ *Generation Partnership Project; Technical Specification Group Radio Access Network; Physical layer procedures (FDD)* (Release 7), 3GPP TS 25.214 V7.11.0, Mar. 2009, pp. 1-87.
International Search Report, mailed Feb. 4, 2010, in corresponding International Application No. PCT/CN2009/071484 (3 pp.).
Written Opinion of the International Searching Authority, mailed Feb. 4, 2010, in corresponding International Application No. PCT/CN2009/071484 (4 pp.).

(Continued)

*Primary Examiner* — Farah Faroul
(74) *Attorney, Agent, or Firm* — Huawei Technologies Co., Ltd.

(57) ABSTRACT

A power control method and device are used for achieving transmit power control of a User Equipment (UE) in a multi-carrier mode. The power control method includes: calculating a transmit power of a UE when the UE sends data through a plurality of carriers; and performing power compression on each carrier either step by step according to property parameters of each carrier or synchronously according to a compression ratio, when the transmit power of the UE exceeds a preset maximum transmit power. A power control device is further provided.

12 Claims, 4 Drawing Sheets

(56) References Cited

OTHER PUBLICATIONS

Office Action, mailed Aug. 1, 2011, in corresponding Chinese Application No. 200980123655.5 (15 pp.).

International Search Report for PCT/CN2009/071484, mailed Feb. 4, 2010.

Extended European Search Report dated Mar. 15, 2012 issued in corresponding European Patent Application No. 09843845.0.

Russian Office Action mailed Nov. 8, 2012 in corresponding Russian Application No. 2011148272.

Notice to Submit a Response, dated Mar. 28, 2013, in corresponding Korean Application No. 10-2011-7027290 (6 pp.).

Notice of allowance issued in corresponding Russian application No. 2011148272/07,dated Jun. 19, 2013,and an English translation thereof,total 17 pages.

Office action issued in corresponding Korean application No. 10-2011-7027290, dated Sep. 5, 2013, and an English translation thereof, total 5 pages.

* cited by examiner

POWER CONTROL METHOD AND DEVICE

CROSS-REFERENCE TO RELATED APPLICATIONS

This application is a continuation of International Application No. PCT/CN2009/071484, filed on Apr. 27, 2009, which is hereby incorporated by reference in its entirety.

FIELD OF THE INVENTION

The present invention relates to the communication field, and in particular, to a power control method and device.

BACKGROUND OF THE INVENTION

With the rapid development of communication technologies, as one of mainstream technologies of the third generation mobile communication system, Wideband Code Division
Multiple Access (WCDMA) has been widely studied and applied. Current versions of the WCDMA include Release99 (R99), Release4 (R4), Release5 (R5), Release6 (R6) and Release? (R7).

In order to increase the data transmission rate and satisfy different requirements, High Speed Uplink Packet Access (HSUPA) technology is introduced into the WCDMA R6, so as to increase the uplink transmission rate. The HSUPA technology is currently carried on a single frequency point, that is, single carrier data transmission.

A maximum transmit power of a User Equipment (UE) is specified in relevant protocols of the WCDMA, and the UE needs to keep the actual uplink transmit power equal to or lower than the indicated maximum transmit power.

In order to control the actual uplink transmit power of the UE, a power control method in the prior art is: calculating a transmit power required by the UE for sending data to be sent on a single carrier; and performing power compression on the carrier if a sum of the calculated transmit power and powers of other uplink channels (that is, the transmit power of the UE) exceeds the maximum transmit power, so as to enable the transmit power of the UE to be lower than or equal to the maximum transmit power.

In order to further increase the data transmission rate in an HSUPA system, an uplink Dual Cell HSUPA (DC-HSUPA) technology is introduced into WCDMA R9, and two uplink carriers may be used to send data at the same time based on the technology, thereby increasing the transmission rate of uplink data. Definitely, with the development of the technology, more carriers may be introduced into the uplink in the future.

Therefore, power control for a plurality of uplink carriers of the UE needs to be configured.

SUMMARY OF THE INVENTION

Embodiments of the present invention provide a power control method and device, which can achieve transmit power control of a UE in a multi-carrier mode.

An embodiment of the present invention provides a power control method, including: calculating a transmit power of a UE when the UE sends data through a plurality of carriers; and performing power compression on each carrier either step by step according to property parameters of each carrier or synchronously according to a compression ratio, when the transmit power of the UE exceeds a preset maximum transmit power.

An embodiment of the present invention provides a power control device, where the device includes: a first calculating unit, configured to calculate a transmit power of a UE; and a first checking unit, configured to judge whether the transmit power of the UE calculated by the first calculating unit exceeds a preset maximum transmit power. The power control device further includes: a step-by-step compressing unit, configured to perform power compression on each carrier step by step according to property parameters of each carrier when the transmit power of the UE exceeds the preset maximum transmit power; or a synchronous compressing unit, configured to perform power compression on each carrier synchronously according to a compression ratio when the transmit power of the UE exceeds the preset maximum transmit power.

It can be seen from the above technical solutions that the embodiments of the present invention have the following advantages.

In a technical solution of the embodiments of the present invention, when a UE sends data through a plurality of carriers, if the transmit power of the UE is higher than a preset maximum transmit power, power compression may be performed on each carrier either step by step according to property parameters of each carrier or synchronously according to a compression ratio, thereby achieving the power compression in a multi-carrier situation.

DETAILED DESCRIPTION OF THE EMBODIMENTS

Embodiments of the present invention provide a power control method and device, for achieving transmit power control of a UE in a multi-carrier mode.

Figure 1:
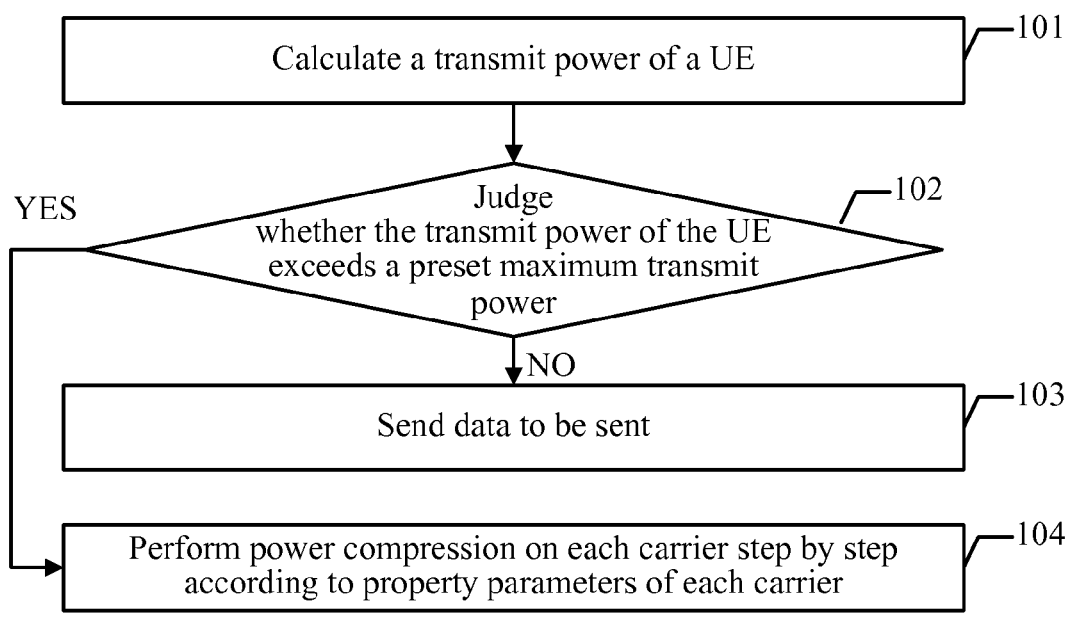
FIG. 1 is a schematic diagram of a power control method according to an embodiment of the present invention.

Referring to FIG. 1, a power control method according to an embodiment of the present invention includes the following.

In step 101, transmit power of a UE is calculated.

In this embodiment, when the UE uses a multi-carrier HSUPA solution, the UE may send data through a plurality of carriers at the same time, and a power control device may obtain data to be sent by the UE on each carrier. In this embodiment, the power control device may be integrated in the UE.

Specifically, the transmit power of the UE includes a total estimated transmit power required by the UE to send the data to be sent on each carrier and powers of other uplink channels of the UE.

In this embodiment, the power control device may obtain the data to be sent on each carrier, and calculate the total estimated transmit power required for sending the data to be sent. The specific calculation process is common sense of persons skilled in the art, and is not limited here.

The UE may send, through a data channel, the data to be sent on each carrier, and in this embodiment, the data channel may be an E-DCH Dedicated Physical Data Channel (E-DPDCH). It should be noted that, in addition to the data channel, other uplink channels in the UE may include a Dedicated Physical Control Channel (DPCCH), a Dedicated Physical Data Channel (DPDCH), an E-DCH Dedicated Physical Control Channel (E-DPCCH), and a Dedicated Physical Control Channel uplink for HS-DSCH (HS-DPCCH), etc. The specific process of obtaining these channels is common sense of persons skilled in the art, and is not limited here.

In step 102, it is judged whether the transmit power of the UE exceeds a preset maximum transmit power, and: if the transmit power of the UE exceeds the preset maximum transmit power, step 104 is performed; if the transmit power of the UE does not exceed the preset maximum transmit power, step 103 is performed.

The maximum transmit power of the UE is specified in relevant protocols of WCDMA, and the maximum transmit power may be decided by two parameters: a maximum output power corresponding to a power level of the UE, and a maximum permissible uplink power configured in a current network of the UE; and the maximum transmit power is a smaller value of the maximum output power and the maximum permissible uplink power.

In step 103, the data to be sent is sent, and the process ends.

If the transmit power of the UE is lower than or equal to the maximum transmit power, the UE may directly send each carrier data to be sent. The sending process is common sense of persons skilled in the art, and is not limited here.

In step 104, power compression is performed on each carrier step by step according to property parameters of each carrier.

If the transmit power of the UE is higher than the maximum transmit power, the UE needs to perform the power compression first before sending the data.

In this embodiment, the specific manner of the power compression is: performing the power compression on each carrier step by step according to the property parameters of each carrier, that is, performing the power compression on each carrier one by one according to a sequence of the property parameters; and judging whether the transmit power after the power compression on every carrier satisfies limitation of the maximum transmit power (that is, whether the transmit power after the power compression is lower than or equal to the maximum transmit power), and if the transmit power satisfies the limitation of the maximum transmit power, stopping the compression and sending each carrier data to be sent.

Specific property parameters may include: an E-DCH Transport Format Combination Indicator (E-TFCI), a Serving Grant (SG) parameter or a DPCCH power, or other types of property parameters, and are not limited here.

In this embodiment, when the UE sends data through a plurality of carriers, if the transmit power of the UE is higher than the preset maximum transmit power, the power compression is performed on each carrier step by step according to the property parameters of each carrier, that is, the power compression is performed on each carrier one by one according to different property parameters of each carrier, so that the power compression may be performed on each carrier one by one according to the sequence of the property parameters, thereby achieving the power compression in a multi-carrier situation.

Figure 2:
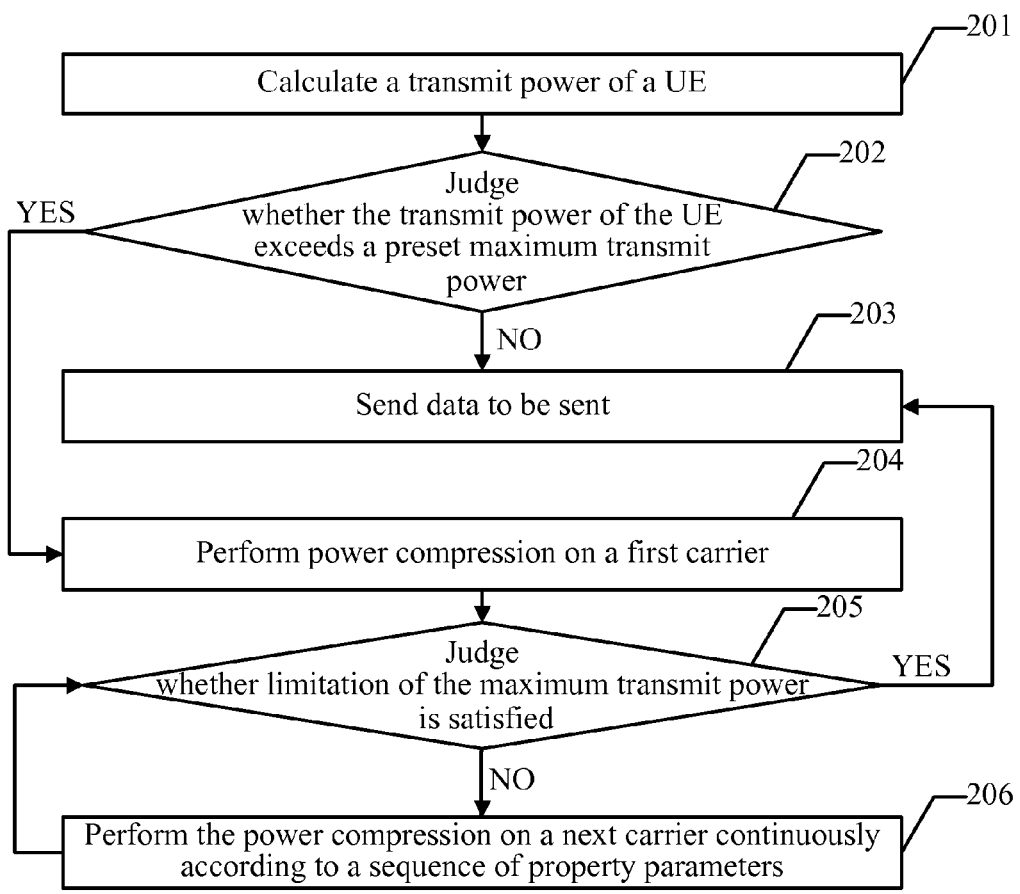
FIG. 2 is a schematic diagram of a power control method according to another embodiment of the present invention.

In order to facilitate understanding, the following describes the power control method in detail with a specific example. Referring to FIG. 2, a power control method according to another embodiment of the present invention includes the following.

In step 201, a transmit power of a UE is calculated.

In this embodiment, the process of calculating the transmit power of the UE is consistent with the process of calculating the transmit power of the UE in step 101, and the details are not described here again.

In step 202, it is judged whether the transmit power of the UE exceeds a preset maximum transmit power, and if the transmit power of the UE exceeds the preset maximum transmit power, step 204 is performed; if the transmit power of the UE does not exceed the preset maximum transmit power, step 203 is performed.

In step 203, data to be sent is sent, and the process ends.

If the transmit power of the UE is lower than or equal to the maximum transmit power, the UE may send each carrier data to be sent. The sending process is common sense of persons skilled in the art, and is not limited here.

In step 204, power compression is performed on a first carrier.

If the transmit power of the UE is higher than the maximum transmit power, the UE needs to perform the power compression first before sending the data.

In this embodiment, the specific manner of the power compression is: performing the power compression on each carrier step by step according to property parameters of each carrier, that is, performing the power compression on each carrier one by one according to a sequence of the property parameters.

In this embodiment, the property parameter may be an E-TFCI, and the E-TFCI may represent a transmission block length of the data to be sent.

In this embodiment, the property parameter may also be a DPCCH power.

In this embodiment, the property parameter may also be an SG parameter, and in a multi-carrier mode, each carrier is corresponding to one SG parameter, and the UE may update the SG according to parameters delivered by a network side.

The SG parameter is used for limiting a maximum permissible power for the UE to perform E-TFC selection, and the SG parameter may be formed by a list which includes an index number and a gain factor (that is, corresponding real power offset).

It should be noted that, in this embodiment, the first carrier may be a carrier on which the data to be sent having the largest E-TFCI locates, or a carrier having the largest SG parameter, or a carrier on which the data to be sent having the smallest E-TFCI locates, or a carrier having the smallest SG parameter, or a carrier having the largest DPCCH power, or a carrier having the smallest DPCCH power.

In practical applications, the specific property parameters may also be other types of property parameters, and are not limited here.

The specific manner of the power compression on the first carrier may be compressing all the E-DPDCH gain factors on the first carrier. The specific manner of the power compression is the same as that for a single carrier in the prior art, which is common sense of persons skilled in the art, and is not limited here.

In this embodiment, each carrier may be sequentially compressed by using multiple property parameters, so as to increase the flexibility of the compression process.

In step 205, it is judged whether the transmit power after the power compression satisfies limitation of the maximum transmit power (that is, whether the transmit power after the compression is lower than or equal to the maximum transmit power), and if the transmit power after the power compression satisfies the limitation of the maximum transmit power, step 203 is performed; if the transmit power after the power compression does not satisfy the limitation of the maximum transmit power, step 206 is performed.

In step 206, the power compression is performed on a next carrier according to the sequence of the property parameters, and step 205 is repeated until the maximum transmit power of the UE is satisfied.

In this embodiment, if the transmit power still cannot satisfy the limitation of the maximum transmit power after the power compression on the first carrier, the power compression may be performed on other carriers continuously according to the sequence of the property parameters; and it is judged whether the transmit power satisfies the limitation of the maximum transmit power after the power compression is performed on each carrier, and if the transmit power satisfies the limitation of the maximum transmit power, the compression is stopped and step 203 is performed; if the transmit power does not satisfy the limitation of the maximum transmit power, the compression continues.

In this embodiment, if the first carrier is a carrier on which the data to be sent having the largest E-TFCI locates, the power compression may be performed on each carrier on which the data to be sent locates according to a descending order of the E-TFCIs.

If the first carrier is a carrier on which the data to be sent having the smallest E-TFCI locates, the power compression may be performed on each carrier on which the data to be sent locates according to an ascending order of the E-TFCIs.

If the first carrier is a carrier having the largest SG parameter, the power compression may be performed on each carrier on which the data to be sent locates according to a descending order of the SG parameters.

If the first carrier is a carrier having the smallest SG parameter, the power compression may be performed on each carrier on which the data to be sent locates according to an ascending order of the SG parameters.

If the first carrier is a carrier having the largest DPCCH power, the power compression may be performed on each carrier on which the data to be sent locates according to a descending order of the DPCCH powers.

If the first carrier is a carrier having the smallest DPCCH power, the power compression may be performed on each carrier on which the data to be sent locates according to an ascending order of the DPCCH powers.

In this embodiment, the manner of the power compression on each carrier is the same as the manner of the power compression on the first carrier described above, both of which are common sense of persons skilled in the art.

In this embodiment, after it is judged that the transmit power of the UE is higher than the preset maximum transmit power, the power compression may be performed on each carrier step by step according to the property parameters of each carrier, that is, the power compression is performed on each carrier one by one according to different property parameters of each carrier. Therefore, according to the solution of this embodiment, the power compression can be performed on each carrier one by one according to the sequence of the property parameters, thereby achieving the power compression in a multi-carrier situation.

In this embodiment, the E-TFCI may be used as the property parameter, and the power compression may be firstly performed on the carrier on which the data to be sent having the largest E-TFCI locates. Since data having a longer transmission block requires a higher transmit power, the power compression is firstly performed on the carrier on which the data to be sent having the largest E-TFCI locates so that the transmit power after compression easily satisfies the limitation of the maximum transmit power, thereby ensuring the sending performance of data having short transmission blocks.

In this embodiment, the E-TFCI may be used as the property parameter, and the power compression may also be firstly performed on the carrier on which the data to be sent having the smallest E-TFCI locates. In this way, it may be ensured that the data to be sent having a longer transmission block obtains a higher transmit power, so that loss of data throughout may be reduced to some extent.

It should be noted that if the transmit power still cannot satisfy the limitation of the maximum transmit power after the power compression on the first carrier, the power compression may be performed on a second carrier according to the above sequence. It may be understood that after the power compression on the second carrier, the power compression of the first carrier may be released, that is, the E-DPDCH gain factor of the first carrier may be recovered to a value before the first carrier is compressed, and at this time, the power compression is only performed on the second carrier; and then it is judged whether the transmit power satisfies the limitation of the maximum transmit power; and if the limitation of the maximum transmit power still cannot be satisfied, the power compression may be performed on other carriers according to the manner. Therefore, the use of this solution may reduce the number of carriers that need to be compressed as much as possible, and may reduce the influence of the power compression on data sending as much as possible.

In order to facilitate understanding, an example is used for description in the following. Assuming that two carriers exist, namely, a first carrier and a second carrier, the E-TFCIs of data to be sent of the two carriers increase in sequence, and in this embodiment, the power compression is performed on each carrier in sequence according to an ascending order of the E-TFCIs of the data to be sent. The maximum transmit power is 30 dBm; the transmit power of the UE is 33 dBm; after the power compression on the first carrier only, the transmit power is 31 dBm; and after the power compression on the second carrier only, the transmit power is 29 dBm. A specific power compression process may be as follows.

The power compression is firstly performed on the first carrier, and the transmit power after compression is 31 dBm which still exceeds the maximum transmit power. In this case, the power compression is performed on the second carrier, and at this time, in order to reduce the number of carriers on which the power compression is performed as much as possible, the power compression of the first carrier may be released. Before performing the power compression on the second carrier, the transmit power of the UE is still 33 dBm, and after the power compression on the second carrier only, the transmit power is 29 dBm, which satisfies the limitation of the maximum transmit power. Therefore, the power compression needs to be performed on the second carrier only.

It should be noted that, the above example describes a situation that the transmit power can satisfy the limitation of the maximum transmit power after the power compression on the second carrier only; however, in practical applications, if the transmit power still cannot satisfy the limitation of the maximum transmit power after the power compression on the second carrier only, the power compression needs to be performed once again on the first carrier, the power compression of which is already released. For example:

The maximum transmit power is 30 dBm; the transmit power of the UE is 33 dBm; the transmit power is 32 dBm after the power compression on the first carrier only; and the transmit power is 31 dBm after the power compression on the second carrier only.

The power compression is firstly performed on the first carrier, and the transmit power after compression is 31 dBm which still exceeds the maximum transmit power. In this case, the power compression is performed on the second carrier, and at this time, in order to reduce the number of carriers on which the power compression is performed as much as possible, the power compression of the first carrier may be released. Before performing the power compression on the second carrier, the transmit power of the UE is still 33 dBm, and after the power compression on the second carrier only, the transmit power becomes 31 dBm which still cannot satisfy the limitation of the maximum transmit power. Therefore, the power compression needs to be performed on the first carrier once again, that is, the power compression is performed on both the first carrier and the second carrier.

In this embodiment, carriers as few as possible are selected for power compression, so as to ensure that most of the data to be sent on most carriers is not influenced, thereby improving the data sending performance.

In this embodiment, if the transmit power still cannot satisfy the limitation of the maximum transmit power after the power compression on each carrier (that is, the transmit power after the compression on all the carriers is still higher than the maximum transmit power), an additional compression process is performed, so as to enable the final transmit power after compression to be lower than or equal to the maximum transmit power. The specific additional compression process may be: directly compressing the transmit powers of each carrier according to a difference between the transmit power and the maximum transmit power, so as to enable the total transmit power after compression to be lower than or equal to the maximum transmit power. In this embodiment, the additional compression may compress all the carriers according to an identical ratio, or compress different carriers by using different ratios, and the specific manner of additional compression is not limited here.

It should be noted that the additional compression is different from the power compression in this embodiment.

Firstly, the power compression is to compress the E-DPDCH gain factors only, while the additional compression is to directly compress the transmit powers.

Secondly, during the additional compress process, the original power ratio between the DPCCH and the DPDCH, the original power ratio between the DPCCH and the HS-DPCCH, the original power ratio between the DPCCH and the E-DPCCH, and the original power ratio between the DPCCH and the E-DPDCH, need to be kept unchanged, that is, the channels are compressed together according to the original gain factors.

It should be noted that the power ratio between the DPCCH and the E-DPDCH is not the ratio before the power compression is performed, but the permissible minimum value of the E-DPDCH specified in protocols after compression, and the additional compression process needs to keep the power ratio between the DPCCH and the minimum value of the E-DPDCH unchanged.

In this embodiment, the detailed process of the additional compression is common sense of persons skilled in the art, and is not limited here.

In this embodiment, if the transmit power of the UE still cannot satisfy the limitation of the maximum transmit power after the power compression on all the carriers, the additional compression process may be further performed, thereby effectively ensuring that the power control in a multi-carrier situation can be achieved.

Figure 3:
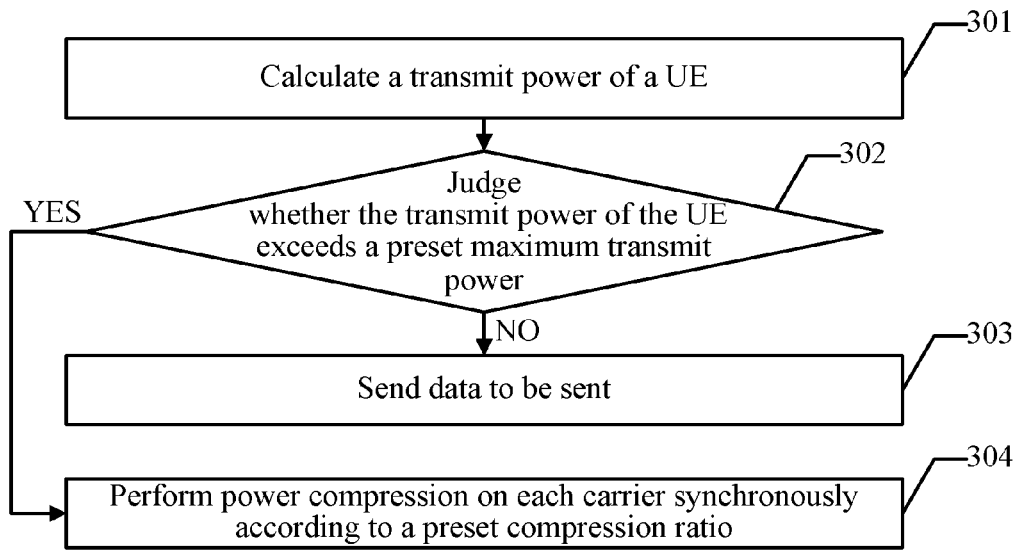
FIG. 3 is a schematic diagram of a power control method according to yet another embodiment of the present invention.

The power control method of the present invention is introduced above, and in the above embodiments, the solution of performing the power compression on each carrier step by step is described. A solution of performing power compression on each carrier synchronously is introduced in the following. Referring to FIG. 3, a power control method according to yet another embodiment of the present invention includes the following.

In step 301, a transmit power of a UE is calculated.

In this embodiment, the process of calculating the transmit power of the UE is consistent with the process of calculating the transmit power of the UE in step 201, and the details are not described here again.

In step 302, it is judged whether the transmit power of the UE exceeds a preset maximum transmit power, and if the transmit power of the UE exceeds the preset maximum transmit power, step 304 is performed; if the transmit power of the UE does not exceed the preset maximum transmit power, step 303 is performed.

In step 303, data to be sent is sent, and the process ends.

If the transmit power of the UE is lower than or equal to the maximum transmit power, the UE may directly send each carrier data to be sent. The sending process is common sense of persons skilled in the art, and is not limited here.

In step 304, power compression is performed on each carrier synchronously according to a preset compression ratio.

If the transmit power of the UE is higher than the maximum transmit power, the UE needs to perform the power compression first before sending the data.

In this embodiment, the specific manner of the power compression is: performing the power compression on each carrier synchronously according to the preset compression ratio, that is, performing the power compression on all the carriers at the same time, in which the power compression may be performed on each carrier by using an identical compression ratio or different compression ratios; then judging whether the transmit power satisfies limitation of the maximum transmit power after the power compression on all the carriers, and if the transmit power satisfies the limitation of the maximum transmit power after the power compression on all the carriers, sending each carrier data to be sent.

In this embodiment, if the transmit power of the UE is higher than the preset maximum transmit power, the power compression may be performed on each carrier synchronously according to the preset compression ratio, that is, the power compression is performed on all the carriers at the same time. Therefore, the power compression can be performed on each carrier at the same time, thereby achieving the power compression in a multi-carrier situation.

Figure 4:
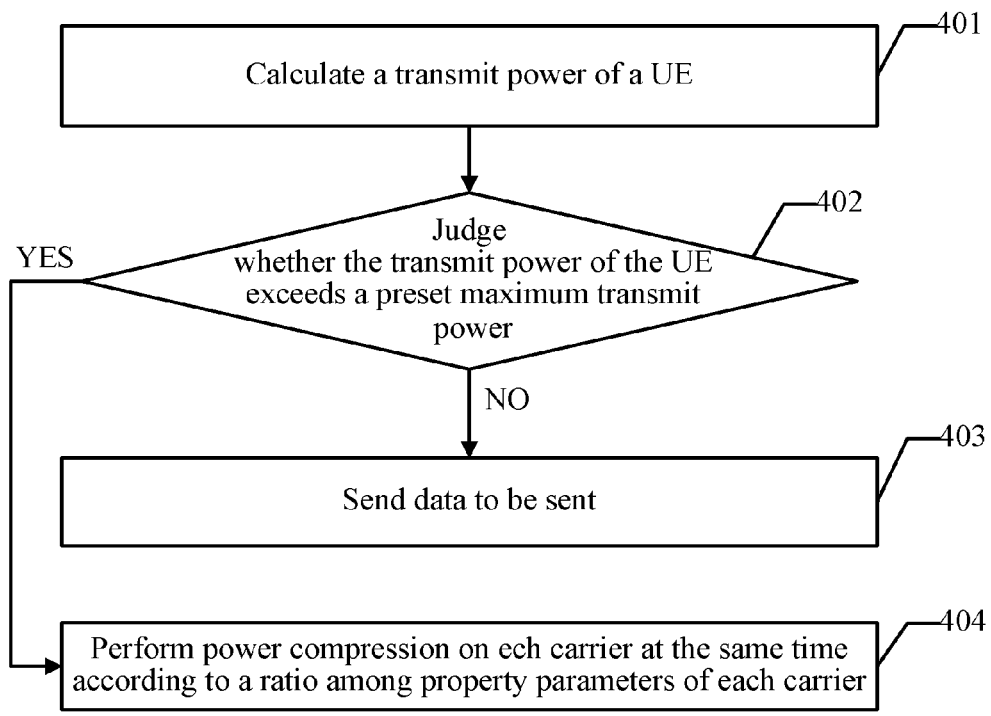
FIG. 4 is a schematic diagram of a power control method according to still another embodiment of the present invention.

In order to facilitate understanding, the following describes the power control method in detail with a specific example. Referring to FIG. 4, a power control method according to still another embodiment of the present invention includes the following.

In step 401, a transmit power of a UE is calculated.

In this embodiment, the process of calculating the transmit power of the UE is consistent with the process of calculating the transmit power of the UE in step 301, and the details are not described here again.

In step 402, it is judged whether the transmit power of the UE exceeds a preset maximum transmit power, and if the transmit power of the UE exceeds the preset maximum transmit power, step 404 is performed; if the transmit power of the UE does not exceed the preset maximum transmit power, step 403 is performed.

In step 403, data to be sent is sent, and the process ends.

If the transmit power of the UE is lower than or equal to the maximum transmit power, the UE may directly send each carrier data to be sent. The sending process is common sense of persons skilled in the art, and is not limited here.

In step 404, power compression is performed on each carrier at the same time according to a ratio among property parameters of each carrier.

If the transmit power of the UE is higher than the maximum transmit power, the UE needs to perform the power compression first before sending the data.

In this embodiment, the specific manner of the power compression is: performing the power compression synchronously on each carrier according to a preset compression ratio, that is, performing the power compression on all the carriers at the same time.

In this embodiment, the compression ratio for the power compression of each carrier is relevant to property parameters of each carrier, and specific property parameters may be an E-TFCI, an SG parameter, or a DPCCH power.

In practical applications, the specific property parameters may also be other types of property parameters, and are not limited here.

After obtaining the property parameters of each carrier, the ratio among the property parameters of each carrier can be calculated.

It should be noted that if the E-TFCI or the SG parameter is used as the property parameter, the compression ratio for performing the power compression on each carrier is directly proportional to the property parameter, that is, the larger the property parameter is, the higher the compression ratio is; or the compression ratio for performing the power compression on each carrier may also be inversely proportional to the property parameter, that is, the smaller the property parameter is, the higher the compression ratio is.

If the DPCCH power is used as the property parameter, the compression ratio for performing the power compression on each carrier is inversely proportional to the property parameter, that is, the smaller the property parameter is, the higher the compression ratio is; or the compression ratio for performing the power compression on each carrier may also be directly proportional to the property parameter, that is, the larger the property parameter is, the higher the compression ratio is.

It should be noted that, step 404 describes the solution in which the compression ratio is relevant to the property parameters of each carrier; however, it should be understood that in other embodiments of the present invention, the compression ratio for the power compression of each carrier may also not depend on the property parameters of each carrier, but directly adopt a preset identical value, that is, all the carriers use the identical value as the compression ratio for the power compression.

The specific compression ratio is determined above, and a specific value of the compression is then determined according to a difference between the transmit power and the maximum transmit power, so the power compression may be performed on each carrier. The specific manner of the power compression is to compress all the E-DPDCH gain factors of each carrier at the same time, and the specific manner of the power compression is the same as that for a single carrier in the prior art, which is common sense of persons skilled in the art, and is not limited here.

In this embodiment, after determining that the transmit power of the UE is higher than the preset maximum transmit power, the power compression may be performed on each carrier synchronously according to the preset compression ratio, that is, the power compression is performed on each carrier at the same time. Therefore, according to the solution of this embodiment, the power compression can be performed on each carrier at the same time, thereby achieving power compression in a multi-carrier situation.

In this embodiment, if the transmit power still cannot satisfy the limitation of the maximum transmit power after the power compression on each carrier (that is, the transmit power after the compression on all the carriers is still higher than the maximum transmit power), an additional compression process may be performed, so as to enable the final transmit power after compression to be lower than or equal to the maximum transmit power. The specific additional compression process is in consistent with the additional compression process described in the embodiment shown in FIG. 2, and the details are not described here again.

In this embodiment, if the transmit power of the UE still cannot satisfy the limitation of the maximum transmit power after the power compression on all the carriers, the additional compression process may be further performed, thereby effectively ensuring that the power control in a multi-carrier situation can be achieved.

Figure 5:
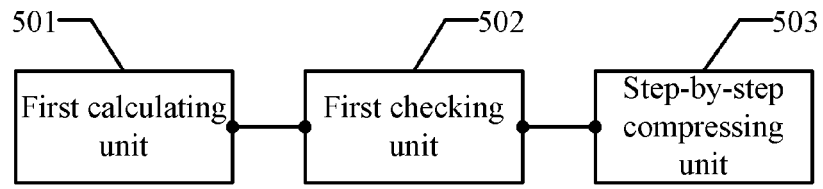
FIG. 5 is a schematic diagram of a power control device according to an embodiment of the present invention.

The following describes a power control device according to an embodiment of the present invention. Referring to FIG. 5, a power control device according to the present invention includes:

a first calculating unit 501, configured to calculate a transmit power of a UE;

a first checking unit 502, configured to judge whether the transmit power of the UE calculated by the first calculating unit 501 exceeds a preset maximum transmit power; and a step-by-step compressing unit 503, configured to perform power compression on each carrier step by step according to property parameters of each carrier when the transmit power of the UE exceeds the preset maximum transmit power.

For a method of calculating the transmit power of the UE by the first calculating unit 501, reference may be made to the embodiment of the power control method shown in FIG. 1.

In this embodiment, the property parameter may be an E-TFCI, an SG parameter or a DPCCH power, or other types of property parameters, and is not limited here.

In this embodiment, after the first checking unit 502 determines that the transmit power of the UE is higher than the preset maximum transmit power, the step-by-step compressing unit 503 may perform the power compression on each carrier step by step according to the property parameters of each carrier, that is, perform the power compression on each carrier one by one according to different property parameters of each carrier. Therefore, according to the power control device provided by this embodiment, the power compression can be performed on each carrier one by one according to the sequence of the property parameters, thereby achieving the power compression in a multi-carrier situation.

Figure 6:
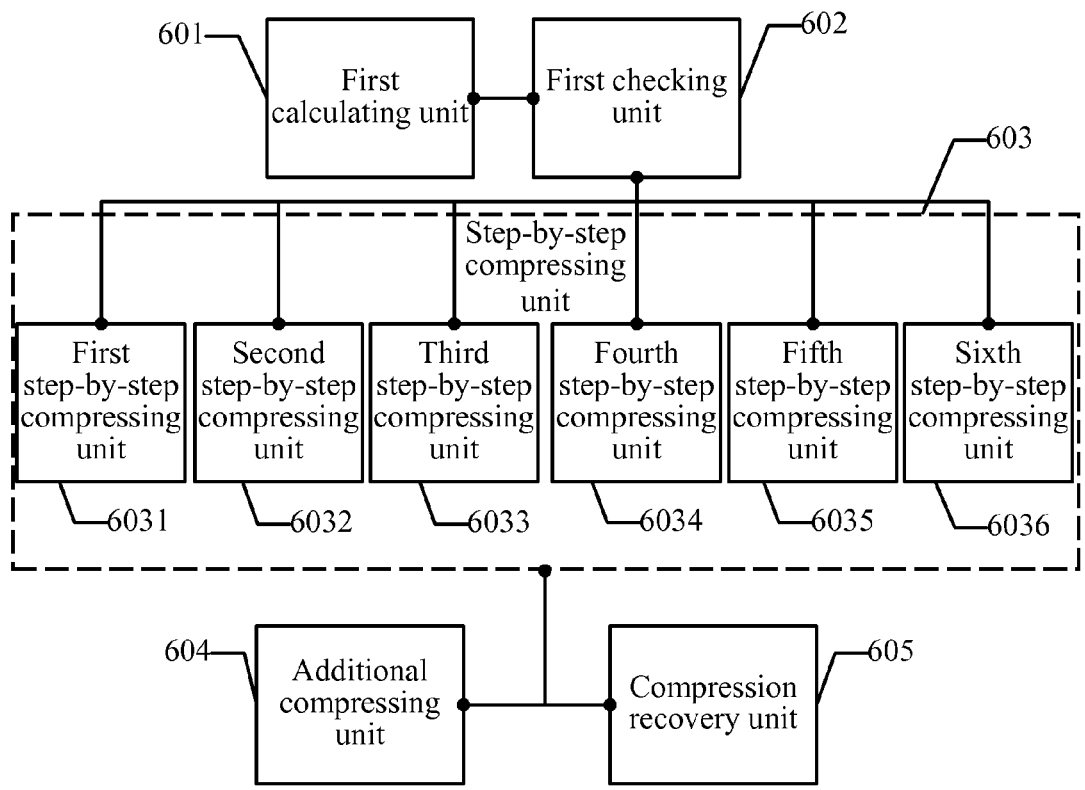
FIG. 6 is a schematic diagram of a power control device according to another embodiment of the present invention.

In order to facilitate understanding, the following describes the above power control device in detail with a specific example. Referring to FIG. 6, a power control device according to the present invention includes:

- a first calculating unit 601, configured to calculate a transmit power of a UE;
- a first checking unit 602, configured to judge whether the transmit power of the UE calculated by the first calculating unit 601 exceeds a preset maximum transmit power; and
- a step-by-step compressing unit 603 is configured to perform power compression on each carrier step by step according to property parameters of each carrier when the transmit power of the UE exceeds the preset maximum transmit power.

The step-by-step compressing unit 603 includes at least one of the following units:

- a first step-by-step compressing unit 6031, configured to: perform the power compression on a first carrier, where the first carrier is a carrier on which data to be sent having a longest transmission block locates, to judge whether the transmit power satisfies limitation of the maximum transmit power, and if the transmit power does not satisfy limitation of the maximum transmit power, to perform the power compression on a next carrier according to a descending order of the transmission block lengths;
- a second step-by-step compressing unit 6032, configured to perform the power compression on a first carrier, where the first carrier is a carrier on which data to be sent having a shortest transmission block locates, to judge whether the transmit power satisfies limitation of the maximum transmit power, and if the transmit power does not satisfy limitation of the maximum transmit power, to perform the power compression on a next carrier according to an ascending order of the transmission block lengths;
- a third step-by-step compressing unit 6033, configured to perform the power compression on a first carrier having the largest SG parameter, to judge whether the transmit power satisfies limitation of the maximum transmit power, and if the transmit power does not satisfy limitation of the maximum transmit power, to perform the power compression on a next carrier according to a descending order of the SG parameters;
- a fourth step-by-step compressing unit 6034, configured to perform the power compression on a first carrier having the smallest SG parameter, to judge whether the transmit power satisfies limitation of the maximum transmit power, and if the transmit power does not satisfy limitation of the maximum transmit power, to perform the power compression on a next carrier according to an ascending order of the SG parameters;
- a fifth step-by-step compressing unit 6035, configured to perform the power compression on a first carrier having the largest DPCCH power, to judge whether the transmit power satisfies limitation of the maximum transmit power, and if the transmit power does not satisfy limitation of the maximum transmit power, to perform the power compression on a next carrier according to a descending order of the DPCCH powers; and
- a sixth step-by-step compressing unit 6036, configured to perform the power compression on a first carrier having the smallest DPCCH power, to judge whether the transmit power satisfies limitation of the maximum transmit power, and if the transmit power does not satisfy limitation of the maximum transmit power, to perform the power compression on a next carrier according to an ascending order of the DPCCH powers.

In this embodiment, the manner of performing the power compression by each unit in the step-by-step compressing unit 603 is similar to the manner of the power compression described in the method embodiments shown in FIG. 1 and FIG. 2, and the details are not described here again.

The power control device in this embodiment may further include: an additional compressing unit 604, configured to be triggered to perform additional compression when the transmit power still cannot satisfy the limitation of the maximum transmit power after the step-by-step compressing unit 603 performs the power compression on all the carriers.

In this embodiment, if the transmit power of the UE still cannot satisfy the limitation of the maximum transmit power after the power compression on all the carriers, the additional compressing unit 604 may continue to perform an additional compression process, thereby effectively ensuring that the power control in a multi-carrier situation can be achieved.

The power control device in this embodiment may further include a compression recovery unit 605, configured to release the power compression of a previous carrier when the step-by-step compressing unit performs the power compression on a next carrier.

The releasing the power compression may specifically be: recovering an E-DPDCH gain factor of the first carrier to an E-DPDCH gain factor of the first carrier before performing the power compression on the first carrier.

In this embodiment, after the first checking unit 602 determines that the transmit power of the UE is higher than the preset maximum transmit power, the step-by-step compressing unit 603 may perform the power compression on each carrier step by step according to the property parameters of each carrier, that is, perform the power compression on each carrier one by one according to different property parameters of each carrier. Therefore, according to the power control device provided by this embodiment, the power compression can be performed on each carrier one by one according to the sequence of the property parameters, thereby achieving the power compression in a multi-carrier situation.

Figure 7:
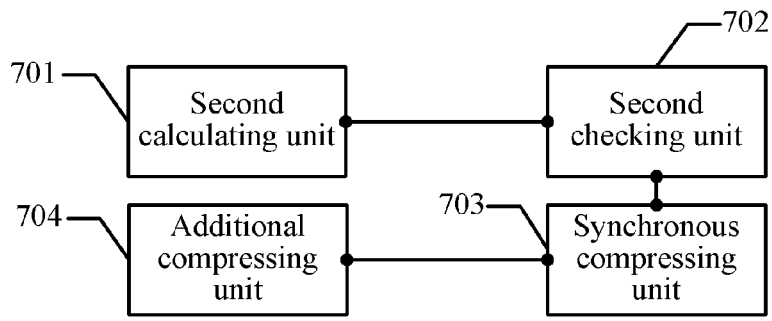
FIG. 7 is a schematic diagram of a power control device according to yet another embodiment of the present invention.

Referring to FIG. 7, a power control device according to yet another embodiment of the present invention includes:

- a second calculating unit 701, configured to calculate a transmit power of a UE;
- a second checking unit 702, configured to judge whether the transmit power of the UE calculated according to the second calculating unit 701 exceeds a preset maximum transmit power; and
- a synchronous compressing unit 703, configured to perform power compression on each carrier synchronously according to a preset compression ratio when the transmit power of the UE exceeds the preset maximum transmit power.

In this embodiment, the preset compression ratio is a preset identical ratio or a ratio among property parameters of each carrier.

It should be noted that, the process of performing the power compression synchronously by the synchronous compressing unit 703 is consistent with the synchronous compression process described in FIG. 3 or FIG. 4, and the details are not described here again.

The power control device in this embodiment may further include an additional compressing unit 704, configured to trigger the additional compressing unit 704 to perform additional compression when the transmit power still cannot satisfy the limitation of the maximum transmit power after the synchronous compressing unit 703 performs the power compression on all the carriers.

In this embodiment, after the second checking unit 702 determines that the transmit power of the UE is higher than the preset maximum transmit power, the synchronous compressing unit 703 may perform the power compression on each carrier synchronously according to the preset compression ratio, that is, perform the power compression on all the carriers at the same time. Therefore, according to the power control device provided by the embodiment, the power compression can be performed on each carrier at the same time, thereby achieving the power compression in a multi-carrier situation.

In this embodiment, if the transmit power still cannot satisfy the limitation of the maximum transmit power after the synchronous compressing unit 703 performs the power compression on all the carriers, the additional compressing unit 704 may continue to perform an additional compression process, thereby effectively ensuring that the power control in a multi-carrier situation can be achieved.

Persons of ordinary skill in the art may understand that all or a part of the steps of the method according to the embodiments of the present invention may be implemented by a program instructing relevant hardware. The program may be stored in a computer readable storage medium. The storage medium may be a ROM, a RAM, a magnetic disk, or an optical disk.

The power control method and device provided by embodiments of the present invention are described in detail above. The principle and implementation of the present invention are described here through specific examples. The forgoing description about the embodiments of the present invention is only for facilitating the understanding of the method and core ideas of the present invention. Meanwhile, persons of ordinary skill in the art can make variations and modifications to the present invention based on the specific implementations and application scopes according to the ideas of the present invention. To sum up, the specification shall not be construed as limitation to the present invention.

What is claimed is:

1. A power control method, comprising:
    calculating, by a user equipment (UE), a transmit power of the UE when the UE sends data through a plurality of carriers; and
    performing, by the UE, power compression on each carrier step by step according to property parameters of each carrier when the transmit power of the UE exceeds a maximum transmit power;
    wherein the performing the power compression on each carrier step by step according to the property parameters of each carrier comprises:
    performing, by the UE, the power compression on a first carrier having a largest Dedicated Physical Control Channel (DPCCH) power; and
    performing, by the UE, the power compression on a next carrier according to a descending order of the DPCCH powers of each carrier if the transmit power after the power compression on the first carrier does not satisfy limitation of the maximum transmit power.

2. The method according to claim 1, further comprising:
    releasing, by the UE, the power compression of a previous carrier when the power compression is performed on the next carrier.

3. The method according to claim 2, wherein the releasing the power compression of the previous carrier comprises:
    recovering, by the UE, an E-DCH Dedicated Physical Data Channel (E-DPDCH) gain factor of the previous carrier to a value before performing the power compression on the previous carrier.

4. The method according to claim 1, wherein if the transmit power after the power compression on all the carriers does not satisfy the limitation of the maximum transmit power,
    performing, by the UE, a preset additional compression process.

5. The method according to claim 1, wherein the performing the power compression on each carrier step by step according to the property parameters of each carrier comprises:
    performing, by the UE, the power compression on E-DPDCH gain factors of each carrier step by step according to the property parameters of each carrier.

6. A user equipment (UE), comprising:
    a first calculating processor, configured to calculate a transmit power of the UE; and
    a first checking processor, configured to judge whether the transmit power of the UE calculated by the first calculating processor exceeds a preset maximum transmit power; wherein
    the UE further comprising:
    a step-by-step compressing processor, configured to perform power compression on each carrier step by step according to property parameters of each carrier when the transmit power of the UE exceeds the preset maximum transmit power;
    wherein the step-by-step compressing processor is further configured to perform the power compression on a first carrier having a largest Dedicated Physical Control Channel (DPCCH) power, and to perform the power compression on a next carrier according to a descending order of the DPCCH powers of each carrier if the transmit power after the power compression on the first carrier does not satisfy limitation of the maximum transmit power.

7. The UE according to claim 6, wherein UE further comprises:
    a compression recovery processor, configured to release the power compression of a previous carrier when the step-by-step compressing unit performs the power compression on the next carrier.

8. The UE according to claim 6, wherein UE further comprises:
    an additional compressing processor, configured to perform an additional compression process if the transmit power can not satisfy the limitation of the maximum transmit power after the step-by-step compressing unit performs the power compression on all the carriers.

9. The UE according to claim 6, wherein
    the step-by-step compressing processor is further configured to perform the power compression on E-DPDCH gain factors of each carrier step by step according to the property parameters of each carrier.

10. A non-transitory computer readable medium, comprising:
    a computer program code, which, when executed by a computer unit, will cause the computer unit to:
    calculate a transmit power of user equipment (UE) when the UE sends data through a plurality of carriers; and
    perform power compression on each carrier step by step according to property parameters of each carrier when the transmit power of the UE exceeds a maximum transmit power;

wherein the computer program code will further cause the computer unit to:

perform the power compression on a first carrier having a largest Dedicated Physical Control Channel (DPCCH) power; and perform the power compression on a next carrier according to a descending order of the DPCCH powers of each carrier if the transmit power after the power compression on the first carrier does not satisfy limitation of the maximum transmit power.

11. The non-transitory computer readable medium according to claim 10, the computer program code will further cause the computer unit to:

perform a preset additional compression process if the transmit power after the power compression on all the carriers does not satisfy the limitation of the maximum transmit power.

12. The non-transitory computer readable medium according to claim 10, the computer program code will further cause the computer unit to:

perform the power compression on E-DPDCH gain factors of each carrier step by step according to the property parameters of each carrier.

* * * * *